United States Patent [19]

Schmidt

[11] 4,002,193
[45] Jan. 11, 1977

[54] CONTOUR-COPYING LATHE AND METHOD OF OPERATING SAME WITH PRESHAPED WORKPIECES

[75] Inventor: Erich Schmidt, Mauerbach, Austria

[73] Assignee: Maschinenfabrik Zuckermann Komm. Ges., Vienna, Austria

[22] Filed: Oct. 7, 1974

[21] Appl. No.: 512,607

Related U.S. Application Data

[63] Continuation-in-part of Ser. No. 338,814, March 7, 1973, Pat. No. 3,863,691.

[30] Foreign Application Priority Data

Oct. 9, 1973 Austria ............................. 8571/73

[52] U.S. Cl. ...................................... 142/7; 142/1; 142/3; 144/144 R
[51] Int. Cl.² ..................... B23Q 35/04; B23B 3/28
[58] Field of Search ................. 142/1, 3, 7, 11, 13, 142/15, 21–30, 37–43; 144/144, 144.5; 51/3, 144

[56] References Cited

UNITED STATES PATENTS

| 1,069,797 | 8/1913 | Lyons | 142/1 |
| 1,375,326 | 4/1921 | Schwarz | 142/13 |
| 1,630,333 | 5/1927 | Duchemin | 142/13 |
| 2,577,932 | 12/1951 | Topham | 142/15 |

FOREIGN PATENTS OR APPLICATIONS

| 532,548 | 8/1955 | Italy | 142/7 |

Primary Examiner—Leonidas Vlachos
Attorney, Agent, or Firm—Karl F. Ross; Herbert Dubno

[57] ABSTRACT

At least one workpiece is rotated synchronously with a model in a contour-copying lathe. A feeler engages the model and is linked to a tool similarly engageable with the workpiece so that as the feeler rides up and down and travels along the model the synchronously displaced tool similarly shapes the workpiece. Those preshaped regions on the model corresponding to the surfaces on the workpiece which are not to be shaped are provided with extensions so that the tool is lifted from the workpiece at these preshaped surfaces.

7 Claims, 6 Drawing Figures

CONTOUR-COPYING LATHE AND METHOD OF OPERATING SAME WITH PRESHAPED WORKPIECES

CROSS-REFERENCE TO RELATED APPLICATION

This application is a continuation-in-part of copending patent application Ser. No. 338,814 filed by me on Mar. 7, 1973 for a CONTOUR COPYING LATHE (now U.S. Pat. No. 3,863,691) and referring to may earlier U.S. Pat. Nos. 3,720,243 and 3,583,102.

FIELD OF THE INVENTION

The present invention relates to a contour copying lathe. More particularly this invention concerns an improved method of operating such a lathe and an improved contour model therefore.

BACKGROUND OF THE INVENTION

In the production of furniture parts and the like a model is generally made by hand, and a contour-copying lathe is used to reproduce this model. Such a lathe generally has a bed in which a plurality of workpieces can be rotated about the coplanar and parallel axes. The model is spanned in the lathe and is rotated about an axis parallel to and coplanar with the workpiece axis. Several arms all pivotal about a common axis transverse to and usually above the rotation axis are all linked together and all have ends engageable with the respective workpiece or with the model. These arms are carried on a carriage which can be displaced parallel to the axis along the bed. The arm engaging the model has at its end a feeler which is usually formed as a roller that rides on the surface of the model. The other arms are provided at their ends with tools rotatable about respective axis lying above the respective workpiece rotation axes in a vertical plane passing through the respective workpiece axis. The tool can be a milling head, sanding drum, or the like.

In use the model and workpieces are all rotated at the same angular velocity, and the carriage is displaced slowly from one end to the other of the lathe. The end of the model arm is urged, usually simply by the weight of this arm, against the model so that the end of the other arms are similarly urged against their respective workpieces. Since these other arms are provided at their ends with cutting or shaping tools the workpieces are cut to a shapes corresponding to that of the model. The model is usually made of wood, and the workpieces are similarly wooden, but it is not unknown to use such devices for machining synthetic resins or soft metals.

In may above-cited copending patent application I describe such an apparatus wherein the tools are rotated about axes transverse to the workpiece rotation axes at a peripheral speed many times greater than the peripheral speed of the workpieces and the speed of relative displacement between the tools and the workpieces. The workpieces and models are moved past the tools or vice versa. The rotation axis of each tool is substantially transverse to the rotation axis of its workpiece so that with such an arrangement the periphery of the tool will run virtually parallel to the grain of the wood and a very fine finish is produced.

There is however a problem in the production of certain items on a contour copying lathe. It has often seemed apparent that shoe soles, golf clubs, rifle and pistol handles, and various furniture parts could be made most efficiently by partially preshaping the workpiece before lathing. This has however been impossible as the tools on the contour-copying lathe invariably sweep the entire surface of the workpiece. Thus one is forced to mount the often hard-to-handle lathed workpiece in a suitable shaping apparatus to form these surfaces. An example is the planar face of a golf club, or the two orthogonal meeting faces of a table leg adapted to lie within the frame of the table top.

OBJECTS OF THE INVENTION

It is therefore an object of the present invention to provide an improved contour copying lathe and an improved method of operating such a lathe.

Another object is the provision of such a lathe and method which allows a workpiece with a preformed surface to be machined without damaging or even touching this surface with the lathe tools.

SUMMARY OF THE INVENTION

These objects are attained according to the present invention in a contour-copying lathe which is operated with a model formed in those regions corresponding to the surfaces of the workpiece that are not to be shaped with extensions that cause the feeler roller of the contour lathe to lift the tools of the lathe away from the workpiece in the corresponding workpiece region. Thus, assuming the workpiece is preformed with a planar surface along one side, that region of the model corresponding to this side is rounded so as to have a radial height relative to the rotation axis of the model greater than that of the preformed surface on the workpiece from its respective axis so that the feeler roller will lift the tool away from the workpiece as it passes over this region.

It is therefore possible in accordance with the present invention to partially shape the workpiece before it is mounted in the copying lathe. Thus for example the faces of a golf club can be carefully milled and the workpiece the fit into the lathe whereupon the remaining contours of the golf head are shaped. This is also advantageous in such workpieces, as a furniture leg whose upper end should be perfectly square so as to fit into the table top, as conventional contour-copying lathes do not produce sharp corners acurately.

In accordance with the present invention the copying lathe may be provided with a primary model having the exact contours of the finished workpiece, and a secondary model formed with the extensions. Disengageable link means is provided connecting the follower for the secondary model from the tool so that, if desired, every surface of the workpiece can be shaped. Each of the feelers and the tool according to the present invention is mounted on a respective arm and the disconnectable link means in accordance with this invention comprises a pivot on that arm having the feeler riding on the secondary model and locking means for allowing pivoting of the end section of this arm carrying the feeler relative to the rest of the arm or to rigidly lock this end section in line with the rest of the arm so that all three linked-together arms closely follow each other.

According to the present invention the model and workpiece are rotated about parallel axes which can lie on common vertical or horizontal plane. When the plane is horizontal the arms carrying the feelers and the tool are all rigidly interconnected and pivotal about a common axis parallel to the plane and transverse to the respective workpiece and model axes. Thus the weight of the tools and feelers alone serves to press them down against the models and workpieces as the pivot axis for these arms is displaced along the workpiece and model axes. When the axes are in a vertical plane their weight is again used, but each of the feelers and tools is mounted on an arm pivoting about a respective axis spaced above and extending perpendicular to the respective workpiece or model axis. In this latter arrangement links are used so as effectively to form a parallelogrammatic linkage that interconnects the various arms and insures that they follow one another.

BRIEF DESCRIPTION OF THE DRAWING

The above and other objects, features, and advantages will be more readily apparent from the following, reference being made to the accompanying drawing in which.

SPECIFIC DESCRIPTION

Figures 1, 2:
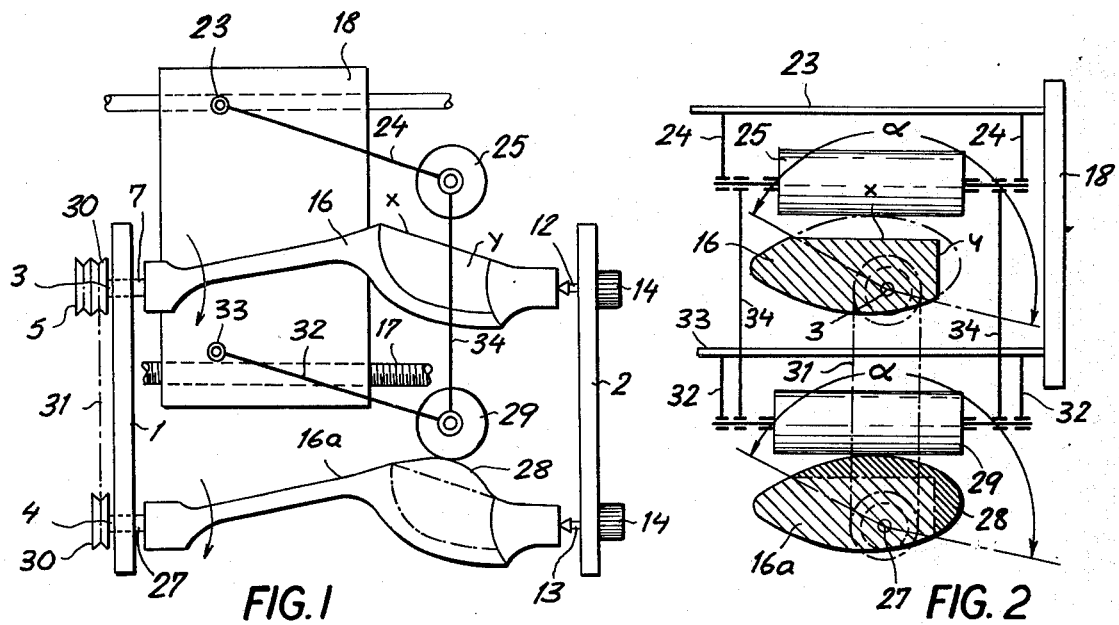
FIG. 1 is a side view of a system according to the present invention.
FIG. 2 is a cross-sectional view of the apparatus of FIG. 1.

As shown in FIGS. 1 and 2 a pair of parallel plates 1 and 2 constitute the head and the tail ends of a contour copying lathe. A workpiece 16 having preshaped planar surfaces $x$ and $y$ is rotatable about an axis 3 between the members 1 and 2 and rotatable about an axis 4 parallel to the axis 3 is a model 16a formed as shown in FIG. 2 with extensions 28 which rise gently from the model 16a in those regions corresponding to the surfaces $x$ and $y$ of the workpiece 16. The workpiece 16 is spanned between a headstock 7 and a tailstock 12 and the model 16a is spanned between a similar headstock 27 and a tailstock 13. Actuators 14 are provided on the tail end of the lathe to axially displace the tailstock 12 and 13 so as to allow fitting of the workpiece and models into the lathe.

Rotationally secured to the headstock 7 and 27 are respective pulleys 30 interconnected by a belt 31. In addition another pulley 5 rotationally connected to the headstock 7 and through the belt 31 to the headstock 27 is connected via a belt 9 to a pulley 10 carried on a motor 11 (see FIG. 5). Thus the workpiece 16 and model 16a are rotatable about their respective axes 3 and 4 synchronously, that is at the same angular speed.

A pair of plates 18 parallel to each other on either side of the lathe and each engaged by a respective lead screw 17 parallel to the axes 3 and 4 for displacement of these plates 18 along the lathe parallel to these axes are provided with respective parallel pivots 23 and 33 for parallel arms 24 and 32 connected at their outer ends by a link 34 for joint parallelogrammatic displacement. The arm 24 carries at its outer end a tool or feeler roller 25 and the arm 32 carries at its outer end a feeler 29.

The device shown in FIGS. 1 and 2 serves to duplicate the contours of the model 16a in the workpiece 16. Thus as the roller 29 passes over the contours of the rotating model 16a, with the slide translating along the length of the lathe, the tool 25 is similarly brought into engagement with the workpiece 16 to shape this workpiece. As the roller 29 comes into contact with the extension 28 over an arc it lifts the tool 25 gradually from the workpiece 16, thereby leaving the surfaces $x$ and $y$ untouched by this tool 25 and then gently sets the tool 25 back on the workpiece after arc is passed. Thus these preshaped surfaces $x$ and $y$ retain whatever characteristics were imparted to them in their earlier shaping operations.

Figure 3:
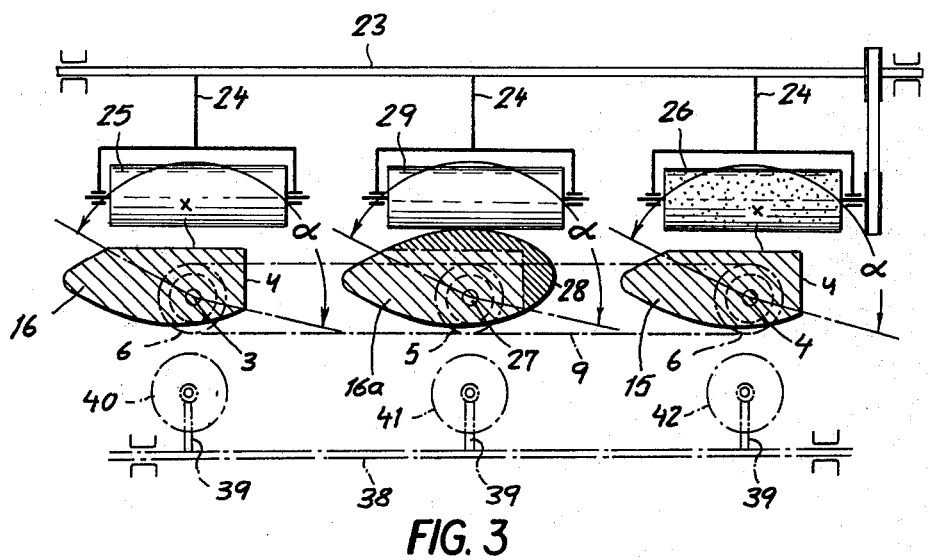
FIG. 3 is a view similar to FIG. 2 illustrating another arrangement in accordance with the present invention.
Figure 6:
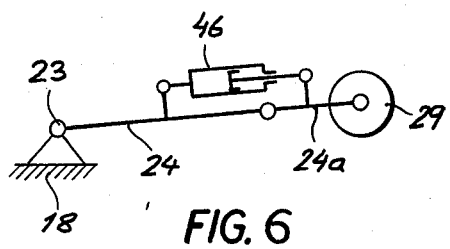
FIG. 6 is a side schematic view illustrating a detail of the arrangement of FIG. 3.

The arrangement shown in FIG. 3 is identical to that shown in FIGS. 1 and 2 except that here a workpiece 15 is arranged next to a primary model 16 and a secondary model 16a, only the secondary model 16a being formed with the extensions 28. A roller 25 engageable with the model 16, a roller 29 engageable with the model 16a, and a sending drum 26 driven by a wheel 37 and engageable with the workpiece 16 are all carried on respective arms 24 secured about a common pivot 23. This device functions much as the device shown in FIGS. 1 and 2, except that here the arm 24 carrying the roller 29 engaging the extended secondary model 16a is provided as shown in FIG. 6 with a hinged outer end 24a controlled by a small hydraulic cylinder 46 so that this end 24a and the corresponding feeler roller 29 can be lifted away from the respective model 16a. Thus should it be desired to machine all of the surfaces of the workpiece 15, including the surfaces $x$ and $y$, the pressure within the cylinder 46 is relieved so that only the feeler roller 25 engageable with the primary model 16 will control the motions of the tool 26.

FIG. 3 also shows how two follower rollers 40 and 41 carried on respective arms 39 and a milling head 42 carried also on an arm 39 are all secured to a common pivot 38 below the models and workpiece. This it is possible in accordance with the present invention to rough in the workpiece 15 before use of the sanding 26. In use the workpiece 15 is roughed in using model 16, then the model 16a is employed to finish sand the workpiece 15, leaving surfaces $x$ and $y$ rough.

Figure 4:
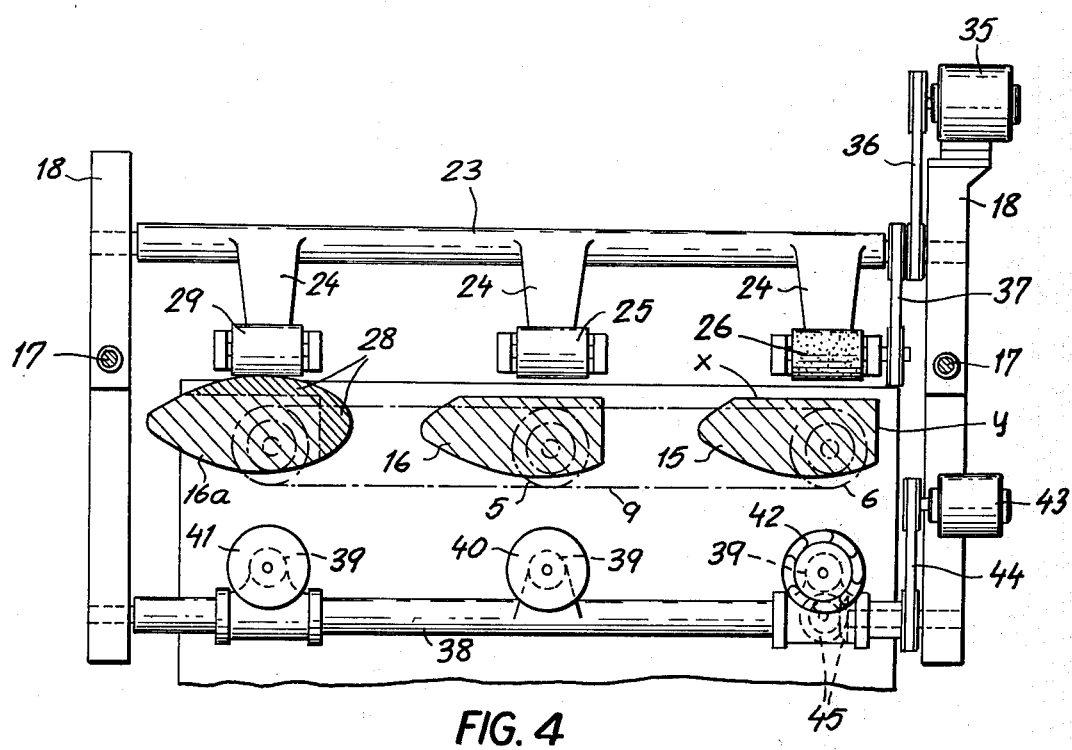
FIGS. 4 and 5 are respectively cross-sectional and top views of yet another copying lathe according to the present invention.
Figure 5:
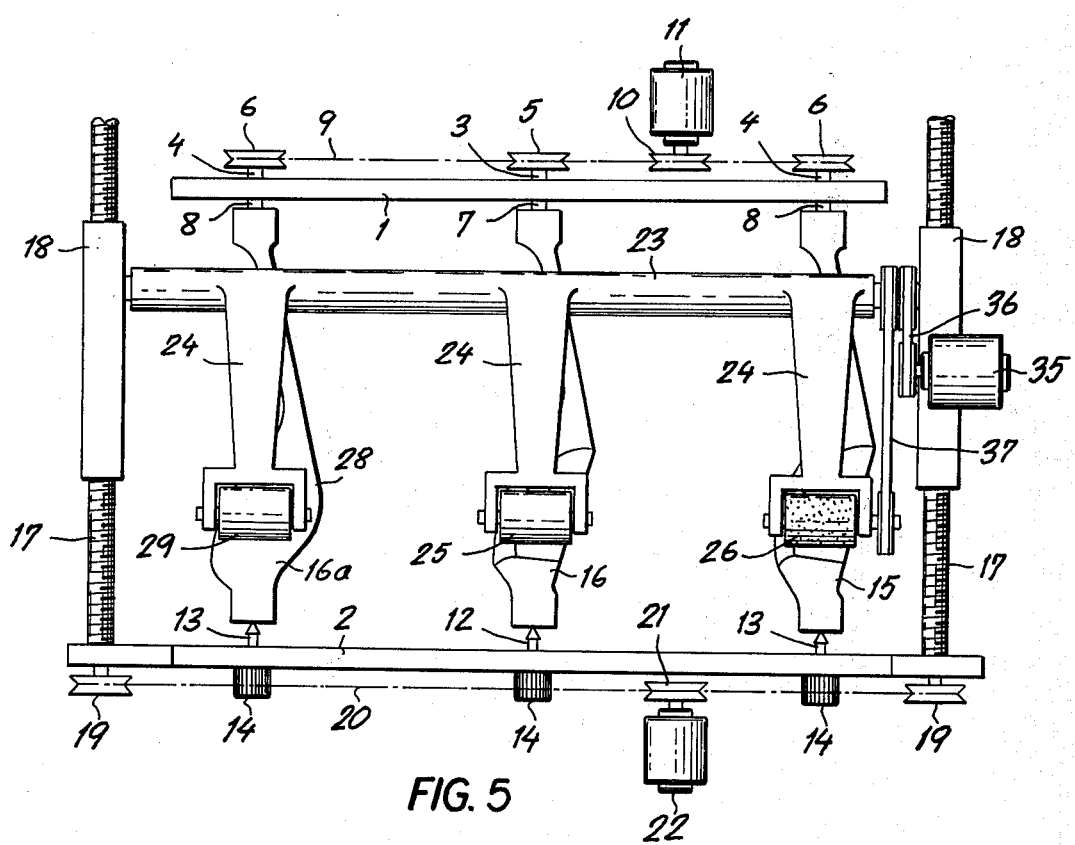

As shown in FIGS. 4 and 5 a motor 43 connected via a belt 44 to a right-angle drive 45 serves to drive the milling head 42. FIGS. 4 and 5 also shown how a motor 35 connected via a V-belt drive 36 and 37 operates the sanding drum 26 so as to rotate is about a respective axis parallel to the axis of the main arm 23 and perpendicular to but not intersecting the axes 3 and 4 of the workpiece 15 and models 16 and 16a. The two lead screws 17 are each shown to have at their ends at the tail end 2 of the lathe respective pulleys 19 connected via a common belt 20 to the output pulley 21 of a drive motor 22 so that rotation of these lead screws 17 parallel to the axes 3 and 4 will cause the slide formed by the two side plates 18 and the arm 23 and 24 to be displaced along the lathe parallel to the axes 3 and 4.

In accordance with the present invention it is possible to preshape various surfaces on a workpiece, such as the face of a golf club head, and thereafter to fit the preshaped workpiece into a copying lathe to form the other contours of the workpiece. In this manner extreme precision can be obtained in the finished product without having the difficulty of fitting the contoured workpiece into a vice or the like for finishing of specific surfaces.

I claim:

1. In a method of operating a copying lathe wherein a workpiece and a model are synchronously rotated about respective parallel axes and a feeler riding on and displaceable along the model is so linked to a sanding tool engageable with and similarly displaceable along the workpiece so that said tool closely follows said feeler to copy the contours of said model into said workpiece, the improvement comprising the steps of:
  providing a model having extensions in regions corresponding to surfaces on said workpiece which are not to be shaped;
  lifting said sanding tool from said workpiece by engagement of said feeler with said extensions; and
  providing a secondary model having the exact shape desired for said workpiece and milling all of the contours of said secondary model in said workpiece in a first pass, then sanding said workpiece according to the shape of the primary model with lifting of said tool from said workpiece at said extensions.

2. The improvement defined in claim 1 wherein said workpiece and model are rotated about horizontally spaced coplanar axes and said tool and said feeler are pivotal about an axis above the workpiece and model axes.

3. In a copying lathe for producing elongated wood articles with a nonuniform configuration wherein at least one workpiece is rotatable about a longitudinal axis and is driven synchronously with at least two models rotatable about corresponding axes parallel to the workpiece axes, each of the models being provided with a separate feeler for controlling a respective tool to shape said workpiece, the feelers and tools being synchronously shiftable axially along said models and workpiece, the improvement wherein said models have essentially the same shapes but one of said models is provided with projections at selected locations therealong to lift the respective tool out of engagement with its workpiece at corresponding locations thereof.

4. In an apparatus for copying the contours of a model into at least one workpiece wherein the workpiece and the model are synchronously rotated about respective parallel axes and a feeler riding on and displaceable along the model is so linked to a sanding tool engageable with and similarly displaceable along the workpiece that said tool closely follows said feeler to copy the contours of said model into said workpiece, the improvement wherein said model is provided with lateral extensions in regions corresponding to surfaces on said workpiece which are not to be shaped so that said sanding tool is lifted from said workpiece as said feeler rides over said extensions, a secondary model, means for rotating said secondary model about an axis parallel to and synchronously with the primary model, a feeler riding on said secondary model and linked to a milling tool, said secondary model having the exact shape desired for said workpiece.

5. In an apparatus for copying the contours of a model into at least one workpiece wherein the workpiece and the model are synchronously rotated about respective parallel axes and a feeler riding on and displaceable along the model is so linked to a tool engageable with said similarly displaceable along the workpiece that said tool closely follows said feeler to copy the contours of said model into said workpiece, the improvement wherein said model is provided with lateral extensions in regions corresponding to surfaces on said workpiece which are not to be shaped so that said tool is lifted from said workpiece as said feeler rides over said extensions, a secondary model, means for rotating said secondary model about an axis parallel to and synchronously with the primary model, a feeler riding on said secondary model and linked to said tool, said secondary model having the exact shape desired for said workpiece, and means for disconnecting the feeler for said primary model from said tool.

6. The improvement defined in claim 5 wherein said apparatus comprises a plurality of commonly pivoted arms two of which carries a respective feeler and one of which carries said tool, said means for disconnecting including a flexible joint in said arms for said feeler for said primary model and means for preventing flexion of said joint.

7. The improvement defined in claim 6 wherein said means for preventing flexion includes a hydraulic cylinder connected across said joint.

* * * * *